(12) United States Patent
Flammer, III et al.

(10) Patent No.: US 6,480,497 B1
(45) Date of Patent: Nov. 12, 2002

(54) METHOD AND APPARATUS FOR MAXIMIZING DATA THROUGHPUT IN A PACKET RADIO MESH NETWORK

(75) Inventors: George Henry Flammer, III, Cupertino; Curtis Bradford, Los Gatos, both of CA (US)

(73) Assignee: Ricochet Networks, Inc., Denver, CO (US)

( * ) Notice: Subject to any disclaimer, the term of this patent is extended or adjusted under 35 U.S.C. 154(b) by 0 days.

(21) Appl. No.: 09/198,060

(22) Filed: Nov. 23, 1998

(51) Int. Cl.$^7$ .................................................. H04L 5/12
(52) U.S. Cl. ........................ 370/400; 370/252; 370/278
(58) Field of Search .................................. 370/230, 235, 370/252, 276, 278, 280, 281, 294, 295, 310.2, 319, 320, 321, 328, 332, 336, 400, 465; 375/133, 135, 136; 455/24, 226.1

(56) References Cited

U.S. PATENT DOCUMENTS

| | | | | |
|---|---|---|---|---|
| 4,495,619 A | * | 1/1985 | Acampora | 370/285 |
| 5,007,052 A | | 4/1991 | Flammer | 370/85.6 |
| 5,048,054 A | | 9/1991 | Eyuboglu et al. | 375/8 |
| 5,150,368 A | | 9/1992 | Autruong et al. | 371/31 |
| 5,297,186 A | * | 3/1994 | Dong | 375/121 |
| 5,425,051 A | | 6/1995 | Mahany | 375/202 |
| 5,432,818 A | | 7/1995 | Lou | 375/324 |
| 5,448,593 A | | 9/1995 | Hill | 375/267 |
| 5,488,608 A | | 1/1996 | Flammer, III | 370/85.13 |
| 5,490,136 A | * | 2/1996 | Sereno et al. | 455/33.1 |
| 5,490,168 A | | 2/1996 | Phillips et al. | 375/224 |
| 5,546,411 A | * | 8/1996 | Leitch et al. | 455/69 |
| 5,548,821 A | | 8/1996 | Coveley | 455/67.4 |
| 5,557,644 A | | 9/1996 | Kuwabara | 375/340 |
| 5,577,087 A | * | 11/1996 | Furuya | 455/226.2 |
| 5,764,699 A | * | 6/1998 | Needham et al. | 375/261 |
| 5,828,677 A | * | 10/1998 | Sayeed et al. | 714/2 |
| 5,828,695 A | * | 10/1998 | Webb | 375/219 |
| 5,974,106 A | * | 10/1999 | Dupont et al. | 375/219 |
| 6,198,734 B1 | * | 3/2001 | Edwards et al. | 370/347 |

OTHER PUBLICATIONS

Ue et al., "Symbol Rate and Modulation Level Controlled Adaptive Modulation/TDMA/TDD for Personal Communications Systems," *IEEE VTE*, pp. 306–310, Jul. 1995 (0–7803–3742–X/95).

Sampei et al., "Adaptive Modulation/TDMA with a BDDFE for 2Mbp/s Multi–Media WireLess Communication Systems," *IEEE VTC'95*, pp. 311–315 (Jul. 1995).

* cited by examiner

*Primary Examiner*—Kwang Bin Yao
*Assistant Examiner*—Frank Duong

(57) ABSTRACT

In a mesh network communication system, net throughput is optimized on the link between the communicating nodes by dynamically modifying signal characteristics of the signals transmitted between nodes in response to performance metrics which have been determined from analysis at the receivers for the corresponding links. The signal characteristics can be the data rate, modulation type, on-air bandwidth, etc. The performance metrics are calculated based on data-link on-air characteristics of received signals.

28 Claims, 3 Drawing Sheets

METHOD AND APPARATUS FOR MAXIMIZING DATA THROUGHPUT IN A PACKET RADIO MESH NETWORK

BACKGROUND OF THE INVENTION

This invention relates to packet communications in a radio-based mesh network, and in particular to techniques for improving throughput of packets via such a network.

In a mesh network, there is an collection of nodes which autonomously connect, send, receive, forward and analyze packetized traffic in the network, which is a shared resource having limitations on traffic capacity. There is a need to optimize performance throughput to the greatest number of users in the network. Heretofore, the nodes have been able to develop performance metrics about themselves and their neighboring nodes which can prove useful in developing throughput improvement schemes. Due to a large installed base of nodes, it is important that new nodes be made backwards compatible with previously installed nodes so that the older nodes are not rendered inoperable.

Mesh packet radio networks are used throughout the world to provide data communication between nodes. These networks are one of several type of data communication network architectures (the other major types being star (e.g., conventional wireline and cellular) and bus (e.g., computer backplane and cable television) and have several advantages over other architectures for providing high capacity data communication over a large area and to a large number of users.

When known radio mesh networks communicate, the radios use a single data rate among all radio that can communicate. There are at least two reasons for using a single data rate:

Hardware simplicity. If the modulation and demodulation hardware operates at but one data rate, it is often much easier and less expensive to implement.

Protocol simplicity. A broadcast on-air protocol supporting only a single data rate is much simpler to design and implement than one intending to coordinate multiple data rates (and, sometimes equivalently, occupied bandwidth) among a plurality of communicating nodes.

Use of a single data rate has permitted implementation of several successful networks, e.g. Metricom's Ricochet data communication network. These networks occupy a spectra, collect, transport and deliver packets at an acceptable level of performance. This level of performance is in many respects limited by the speed of the constituent links. Extending the performance of these types of networks is the subject of continuing development efforts; this invention teaches the results of one such effort.

Technologies from other environments are known which have been considered as useful in developing solutions to the problems hereinabove described. For example, there are modulation techniques previously considered for PCS radio systems, as in Ue et al., Symbol Rate and Modulation Level Controlled Adaptive Modulation/TDMA/TDD for Personal Communication Systems, IEEE VTE, July 1995, pp. 306–310 (0-7803-3742-X/95). Therein the concern was mainly to combat delay spread, which is the temporal distortion in the time of arrival of a particular bit or symbol of information. The function was to estimate the channel based upon conditions at the transmitter.

Seiichi Sampei, Norihiko Morinaga, and Yukiyoshi Kamio, Adaptive Modulation/TDMA with a BDDFE for 2 Mbp/s Multi-Media Wireless Communication Systems, IEEE VTC'95, July 1995, pg. 311–315. This reference describes a technique whereby a modulation scheme is chosen based upon estimates by or at the transmitter which then "sends" the link to a channel preselected to support that modulation scheme.

Patents uncovered during the course of research include the following.

U.S. Pat. No. 5,048,054 to Eyuboglu, et. al. issued Sep. 10, 1991 entitled Line Probing Modem and assigned to Codex Corporation describes an adaptive modem which probes both ends of a link.

U.S. Pat. No. 5,557,644 to Kuwabara issued Sep. 17, 1996 entitled Signal Demodulating and Decoding Apparatus and Signal Demodulating and Decoding Method and assigned to Hitachi, Ltd. describes parallel demodulators.

U.S. Pat. No. 5,490,168 to Phillips, et. al. issued Feb. 6, 1996 entitled Method and System for Automatic Optimization of Data Throughput Using Variable Packet Length and Code parameters and assigned to Motorola, Inc. describes modification of the packet length with changing channel characteristics, with the two "predetermined" coding rates, using varying packet length, as well as a method for transitioning the receiving and transmitting ends of the link from the "efficient" packet to the more "robust" (i.e., shorter) packet, and changing between the predetermined coding rates and packet lengths. An alternative includes transitioning from the shorter packets to the longer packets, using counts of the channel errors to change the length of the packets and their related coding rates.

U.S. Pat. No. 5,150,368 to Autruong, et. al. issued Sep. 22, 1992 entitled Minimization of Modem Retransmissions originally assigned to Rolm Systems (now part of Siemens) describes selective retransmission (BEC) with bitwise voting to reach a valid checksum.

U.S. Pat. No. 5,425,051 to Mahany issued Jun. 13, 1995 entitled Radio Frequency Communication Network Having Adaptive Parameters and assigned to Norand Corporation (Cedar Rapids, Iowa) describes an adaptive RF network.

U.S. Pat. No. 5,548,821 to Coveley issued Aug. 20, 1996 entitled Adaptive System for Self-Tuning and Selecting a Carrier Frequency in a Radio Frequency Communication System describes an automatic frequency control technique.

Patents uncovered in a survey of keywords include: U.S. Pat. No. 5,432,818 issued Jul. 11, 1995 to Yuang Lou entitled Method and Apparatus of Joint Adaptive Channel Encoding, Adaptive System Filtering, and Maximum Likelihood Sequence Estimation Process by Means of an Unknown Data Training; and U.S. Pat. No. 5,448,593 issued Sep. 5, 1995 to Lawrence Hill, assigned to Cyplex Corporation, entitled Frequency Hopping Time-diversity Communications Systems and Transceivers for Local Area Networks. This patent describes power line carrier communication which uses modulation of frequency pairs selected from sets of pairs. Both ends communicate using the same modulation scheme.

Reference is also made to the prior work of the current inventors, such as Method and System for Routing Packets in a Packet Communication Network Using Locally Constructed Routing Tables, U.S. Pat. No. 5,488,608 issued Jan. 30, 1996; and Method for Routing Packets by Squelched Flooding, U.S. Pat. No. 5,007,052 issued Apr. 9, 1991.

SUMMARY OF THE INVENTION

According to the invention, net throughput is optimized on the link between the communicating nodes by dynamically modifying signal characteristics of the signals transmitted between nodes in response to performance metrics which have been determined from analysis at the receivers for the corresponding links. The signal characteristics can be the data rate, modulation type, on-air bandwidth, etc. The performance metrics are calculated based on data-link on-air characteristics of received signals.

In one embodiment, the performance metrics are based upon the historical information about the link that are available at the affected nodes. Each node in the radio network continually collects information regarding measurable on-air characteristics (or specific parameters) while retaining information regarding categories of interference to received packets. The node collects and retains these data both on a per-link and per transmission (specific packets sent and received from a specific node) and a locality-specific basis.

The communication between two nodes has signal characteristics that affect the performance metrics. These signal characteristics include data rate, packet length, modulation type, forward error correction, backwards error correction, bit-wise interleaving, frequency channel selection, power level, block size and/or computational complexity. Probability information can be gathered as a performance metric, such as, a probability of successful transmission between the two nodes, a probability of a bit error in the communication upon receipt at a receiving node, a probability of a packet error in the signal at the receiving node, and a signal strength of the signal at the receiving node. In one embodiment, the data rate of the signal transmitted between the nodes is dependent on a required link signal strength. Some embodiments could communicate between the nodes using spread spectrum transmission.

The optimization is achieved by providing dynamically-varying data rate, modulation techniques, occupied bandwidths, etc., on a per-link basis using intelligent (computer-controlled) radio hardware. The intended receiver dynamically adapts to the signal being received. In one embodiment, the receiver adapts by sensing data rate through a start sequence delivered with each packet where adaptive operation is required.

This start sequence is transmitted with each packet from the transmitting node. The receiving node senses the start sequence of each packet sent to the receiving node. Interpretation of each packet can be adjusted in response to the start sequence in order to adapt to the received signal. For example, the start sequence could indicate a particular modulation technique where the receiving node dynamically adapts to the particular modulation technique indicated by the start sequence.

When a mesh network is created using dynamically varying links according to the invention, the resultant system delivers the highest performance capable of being supported given the topology and propagation extant at the time of the transmission. This variability is designed to be exploited on a per-link basis. This means that a given radio might use a lower data rate for transmitting on a link from, for example, Node A to Link B (Link A=>B) while using a higher data rate for transmitting on another link such as from Node A to Node C (Link A=>C). Additionally, Node B may (and will often) use a different data rate when communicating back to Node A (Link B=>A). Since each radio is capable of several different data rates, each can select the speed that will probabilistically provide the highest net speed.

The foregoing, together with other objects, features and advantages of this invention, will become more apparent when referring to the following specification, claims and the accompanying drawings.

DETAILED DESCRIPTION OF THE PREFERRED EMBODIMENTS

Figure 1:
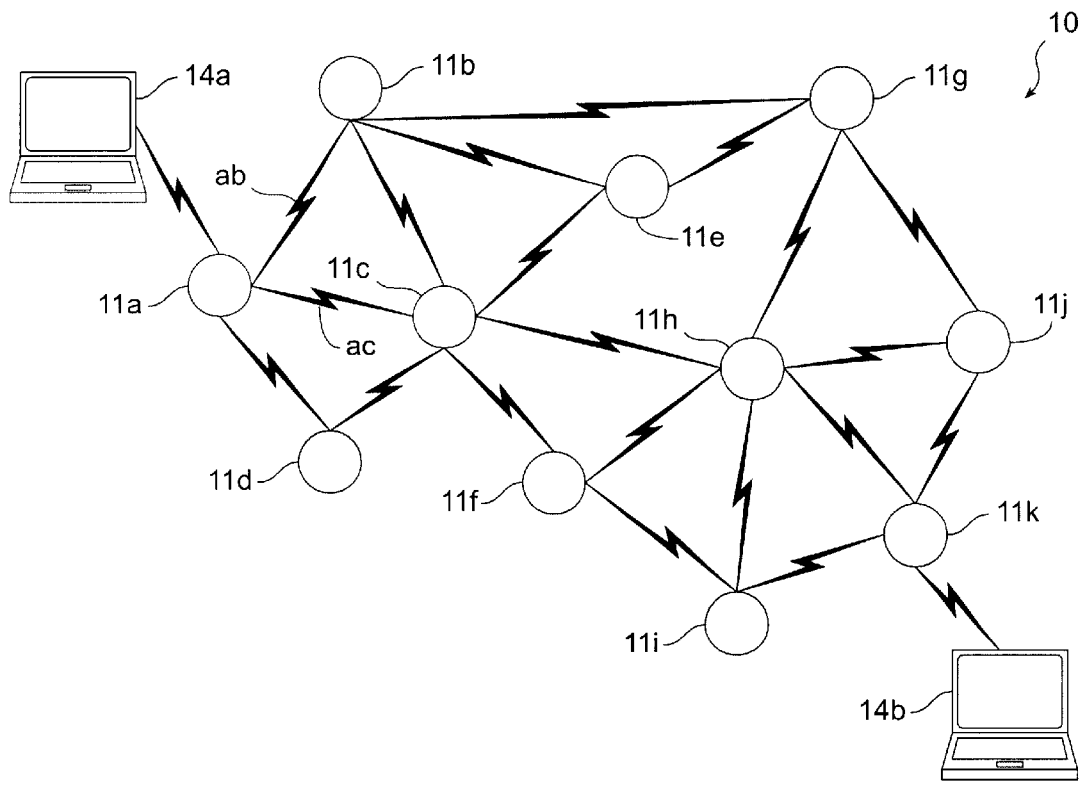
FIG. 1 is a block diagram of a mesh network illustrating nodes having a plurality of data rate capabilities in accordance with the invention.

Referring to FIG. 1, there is shown a block diagram of a mesh network 10 illustrating nodes A, B, C, D, E, F, G, H, I, J, K numbered 11a–11k, respectively. In accordance with the invention, each node 11 has capabilities for transmitting to and receiving from various other nodes 11 at one of a plurality of data rates in each direction. In such a network 10, an interconnected mesh of data-packet sending and receiving nodes is collectively collecting, routing and delivering data packets.

Figure 2:
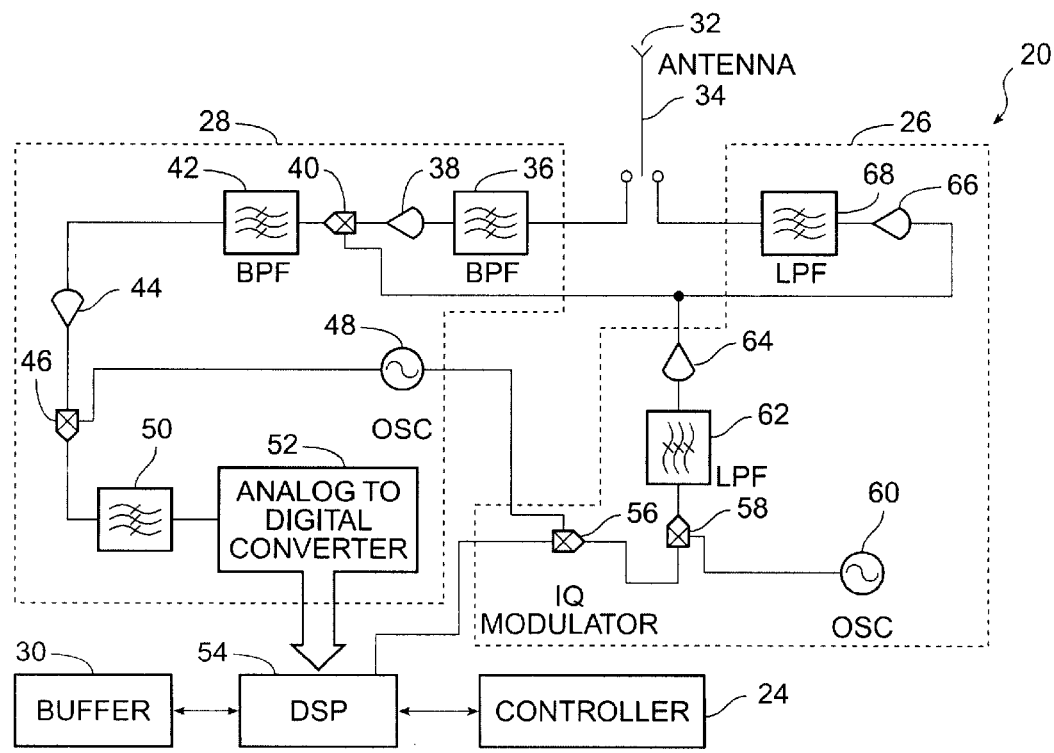
FIG. 2 is a detailed block diagram of a typical node with transmitter(s), receiver(s), buffer storage and control elements.

The network 10 has a controller 24 at each node 11 (see FIG. 2). Initially, each node 11 (for example, Nodes A and B) operates at a default data rate in order to establish a pair of links, such as Link A=>B and Link B=>A. Each controller-controlled radio-based node 11 monitors traffic and the success of traffic, as indicated by repetitions, information on lost packets, and the like, and constantly develops performance metrics between itself and other regularly-linked nodes. Each node 11 may then optionally and dynamically vary one or more signal characteristics of signals transmitted to other nodes 11 on a per-link basis to maintain the highest possible network speed. For example, the node 11 can vary the transmit data rate and/or the transmission-occupied bandwidth. It should be noted that the links may, but need not, share the same spectrum or time slot, in a time slotted or frequency hopping network.

Referring to FIG. 2, there is shown a detailed block diagram of a typical transceiver 20 within each node 11. Transceiver 20 comprises transmitter(s) 26, receiver(s) 28, buffer storage 30 and a controller 24. Signals from one link are received on an antenna 32 and routed through a hybrid or switch 34 to a bandpass filter 36. The filtered signal from filter 36 is amplified by buffer amplifier 38 and provided to IF converter 40. The output of the IF converter 40 is provided to another bandpass filter 42 and the filtered output is provided to an amplifier 44. The output of amplifier 44 is provided to a mixer 46 which is controlled by a local oscillator 48. The downconverted signal from mixer, 46 is provided to a further bandpass filter 50 and the filtered output is provided to an analog to digital converter 52. The digital output of converter 52 is provided to a DSP processor 54.

The DSP processor 54 extracts the information and passes the control data to the controller 24. The information can be stored in buffer storage 30 which is connected to the DSP processor 54. The controller 24 in turn, among other tasks, provides the collection, analysis and storage of the performance metrics of the node. The controller 24 further instructs the DSP processor 54 to assemble outbound packets with the proper signal characteristics (e.g., the bit rate, packet length, frequency and bandwidth) suited for the link to which it is to be applied.

The outbound packets from DSP processor 54 are provided to an IQ modulator 56 which is under control of the oscillator 48. The modulated signal from modulator 56 is provided to a mixer 58 which is under control of a local oscillator 60. In frequency-agile embodiments, the frequency of oscillator 60 is typically chosen on a time slot or on a packet by packet basis.

Output of mixer 58 is provided to a lowpass filter 62 (which might alternatively be a bandpass filter) and the filtered output is provided to a buffer amplifier 64. The output of amplifier 64 is provided to amplifier 66. The output of amplifier 66 is provided to an output bandpass/lowpass filter 68, through the switch 34 and transmitted from the antenna 32. The output of amplifier 64 is also provided as an input to IF converter 40 for the purpose of providing a precise Local Oscillator (LO) signal to multiply with the received signal resulting in a baseband signal for the DSP processor.

During the receive interval, the received signal enters each node via antenna 32 through transmit-receive switch 34. It then is routed through a first bandpass filter 36 and receive preamplifier 38. At a first mixer 40, the amplified and filtered receive signal is mixed with a local oscillator (LO) signal which was generated by oscillator 60. The intermediate frequency (IF) product of the two signals is passed through second bandpass filter 42, again amplified at second amplifier 44 and presented to a second receive mixer 46. At this mixer, it is multiplied by a second local oscillator 48 to create a baseband signal which, after passing through a further lowpass filter 50, it is presented to an Analog-to-Digital (A/D) converter 52 which converts the analog signal to a stream of digital words representing its amplitude variations over time.

The digital stream is processed by the Digital Signal Processor (DSP) unit 54 under control of a controller 24 to extract the transmitted information it carries. Since the data are sent in short sequences known as "packets", the DSP unit 54 further processes the signal to determine the extent of each packet, which it stores in a shared memory buffer 30. Here the packet and its attendant media-specific information (e.g., packet signal strength, data rate, etc.) are available for other, higher layer processes within the node 11.

Figure 3:
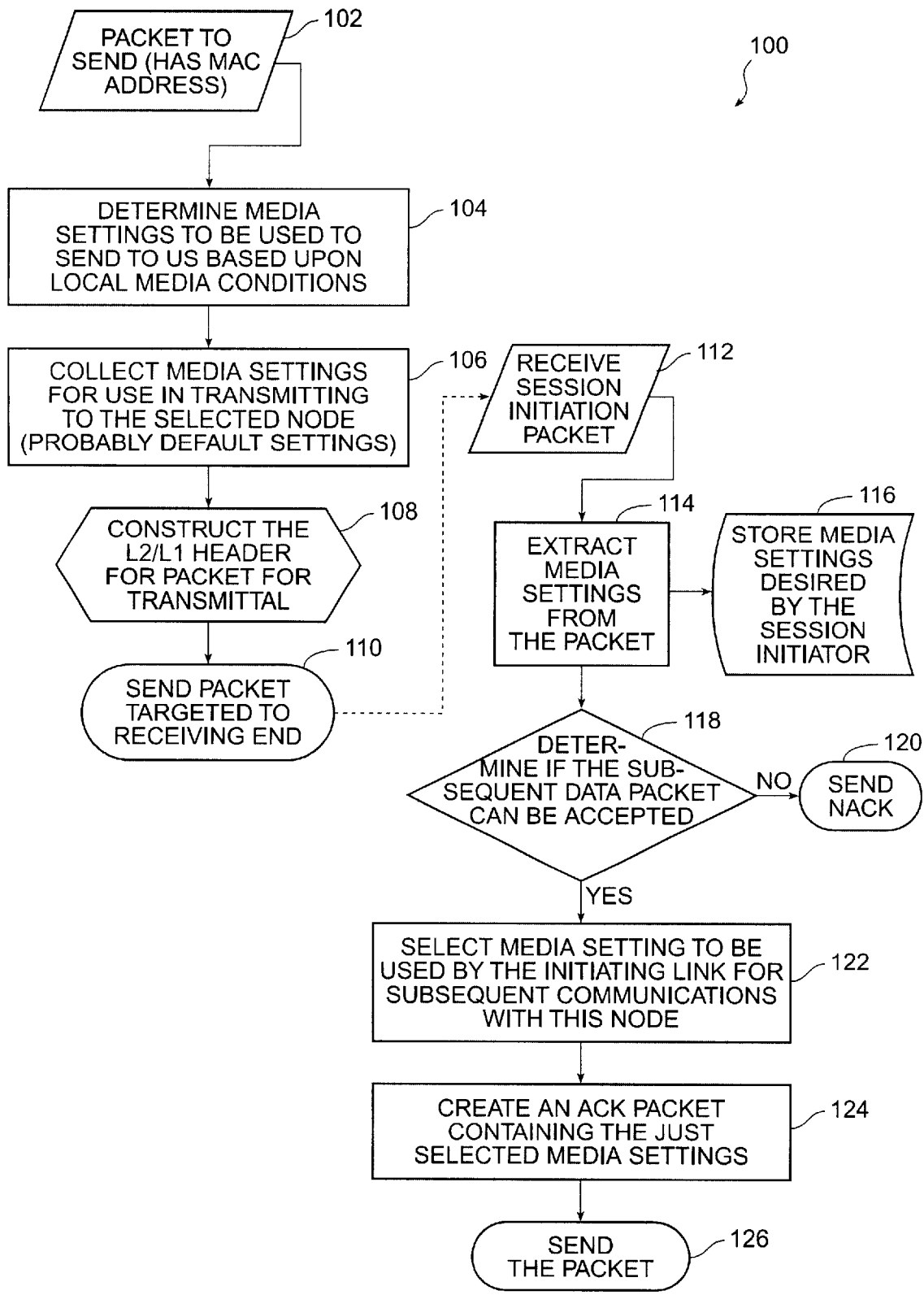
FIG. 3 is a flow chart illustrating the control function of the control elements.

Referring to FIG. 3, there is shown a flow chart 100 illustrating the sequence to be performed to during the initiation phase of communication between two nodes. Initially, at block 102, a transmitting node has an initiation packet to send to a receiving node within the network. The initiation packet comprises a Media Access Contention (MAC) address which allows the transmitting node to determine the identity of the receiving node. At block 104, the transmitting node determines the media settings, (i.e., the transmit parameters such as modulation type, which may be QPSK or 16 QAM, for example, channel (frequency), symbol rate, and codings (such as FEC or Reed-Solomon)) to be used to send the packet based upon local media conditions. At block 106, the transmitting node determines the media settings to use in transmitting the packet to the selected receiving node. Again, the media settings are selected based upon local media conditions, which are known at the transmitting node, of the link to the receiving node. However, since the local media conditions are not known initially, the transmitting node uses the default settings. At block 108, the transmitting node constructs the L2/L1 header for the data packet for transmittal. The L1 header contains information about the physical (e.g. L1) layer of the packet processing. It contains the signal strength of the received packet, its length (in bytes), the time of arrival and the port it came in (or is due to go out on). The L2 Header contains information required to assure that correct and ordered packets can be presented to the next higher layer (L3, the routing layer). The L2 header consists of the MAC address of the destination and source and some control fields for communication between the L2 entities at each end of the link. Finally, at block 110, the transmitting node sends the packet targeted to the receiving node.

The receiving node receives the session initiation packet at block 112. At block 114, the media settings are extracted from the packet. The session initiator within the receiving node stores the desired media settings at block 116.

At block 118, the receiving node determines if the subsequent data packet can be accepted. If the data packet cannot be accepted, a negative acknowledgment (NACK) packet is transmitted back to the transmitting node to indicate this condition, at block 120. Otherwise, the receiving node selects the media settings to be used by the initiating link (from the transmitting node to the receiving node) for subsequent communications with this transmitting node, at block 122. The receiving node then creates an acknowledgment (ACK) packet that contains the just selected media settings, at block 124. The receiving node then sends the ACK packet to the transmitting node, at block 126. Upon receiving the ACK packet, the transmitting node extracts the media settings for use in future transmission to the receiving node. At this point, each end of the dual link has received the media settings to use when communicating with the other end of the link.

Figure 4:
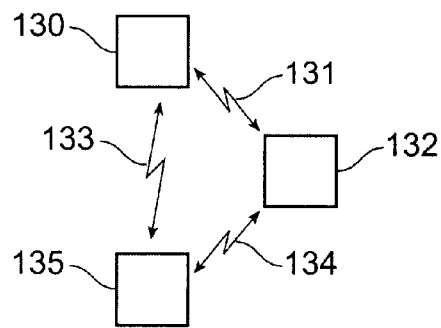
FIG. 4 is a block diagram for illustration of one networking scenario.

Referring to FIG. 4, an alternative embodiment is disclosed. A node 130, having analytically or algorithmically determined the media parameters which perform best (deliver the highest performance or reliability) at its location, delivers the parameters across a link 131 to a media parameter repository 132. This repository 132 holds media parameters for all nodes 11 within single hop range. It may then either deliver these parameters to the intended destination node 135 over link 134 or it may respond to a query form node 135 with the desired parameters.

Figure 5:
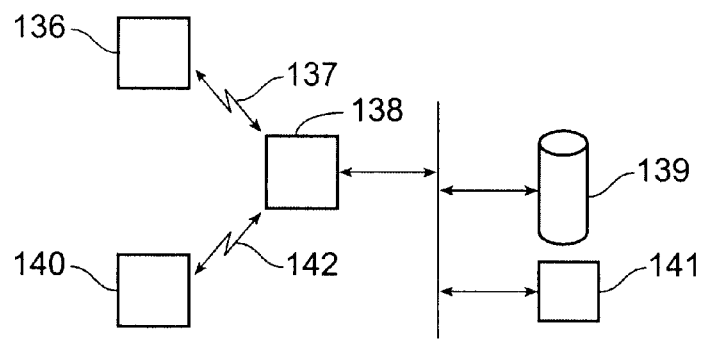
FIG. 5 is a block diagram for illustration of an alternative networking scenario.

Referring to FIG. 5, a third alternate embodiment uses an online database to store media parameters for, potentially, the entire network. In this embodiment, any node 136 can, after determining the preferential media parameters for its location, send these parameters to a database computer 138 which then stores these data in a long term memory 139 for retrieval by any or all. Having a single location containing the media information for all nodes in the network simplifies network software and provides a secure storage location. Additionally, performance monitoring software running on workstations 141 can access immediate and historical media parameters to spot trends and developing network performance problems.

Optimization of the throughput of the network can be achieved by dynamically modifying the signal characteristics of signal transmitted between nodes. Specifically, since the signal characteristic which is typically modified is bit rate, modification of this parameter affects the complexity and/or bandwidth of the transmitted signal. Bit rate is defined as the number of information bits per second transmitted over the link. Complexity is the amount of computation required to create the modulated signal and to demodulate it upon reception. And bandwidth is the amount of spectrum the signal occupies during an arbitrary time duration. The complexity and bandwidth are the determining factors in the probability of a successful transmission on a link: the faster the bit rate, the lower the probability of success, with other factors, such as noise and power, being unchanged.

Each node in the radio network continually collects information regarding measurable on-air parameters while retaining information regarding categories of interference to received packets. The node collects and retains these data both on a per-link (specific packets sent and received from a specific node) and a locality-specific basis. Carrying these data entails at least two costs: the costs of the local memory to store the information until it collectively obtains statistical validity, and the protocol costs of making sure that the modulation, bitspeed, error correcting codes and decisions being made by the nodes use valid (current) data.

Figure 6:
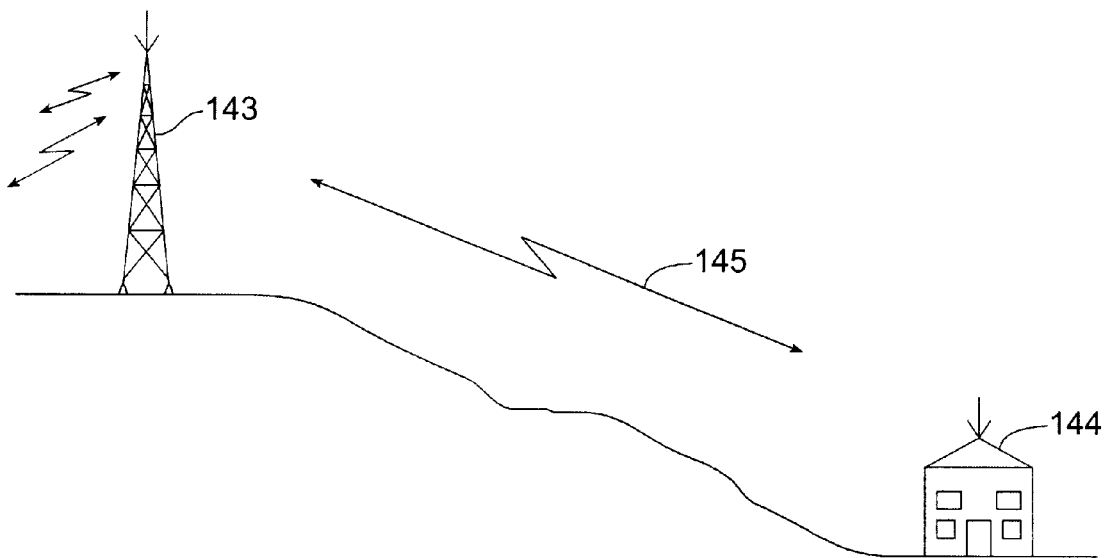
FIG. 6 is a block diagram for illustration of still further networking scenarios.

To illustrate how the media parameters are calculated; the following two examples are presented. Referring to FIG. 6, there are two radio locations: One is located on a hill or other propagationally-favorable location 143 and is within range of a number of nodes, including node 144. Node 144 is located for illustration purposes on the roof of a building near a potential network user. The building is not located favorably to many other radios and thus may well depend upon node 143 for its network connectivity. Moreover, the local conditions for reception of signals will vary greatly between the two locations, 143 and 144. At node 143, since it is within range of a large number of nodes (not illustrated) it is subject to interference from unintended reception of other's signals. Node 144, on the other hand, enjoys the relative quiet in its sheltered location. Clearly, since the conditions for optimal reception differ between site 143 and site 144, the network throughput would be optimized by selecting the highest speed transmission that historical statistics predict will be received at each end of the link 145. With this (not unlikely) scenario in mind, and with the additional information that communication between the node is possible at the slower "default" speeds, Node 143 would convey to Node 144 the results of its analysis of packets received (both successfully and unsuccessfully) by itself. In this scenario, analysis would indicate that, since the link 145 is short and signal levels are high, the optimal media parameters are very high speed (and thus short packets) but with a high degree of redundancy (to combat the large number of packet "collisions" node 143 is experiencing). In this case, the proper redundancy to add to the packet is called "block coding". Block coding can dramatically lengthen the packet and thus the transmission time, but permits recovery of the whole packet even if some part of it is damaged by simultaneous reception of another signal. Conversely, Node 144 requires no such expensive coding and therefore informs node 143 that such coding is unnecessary.

A second example of the use of this method can again be illustrated by referencing FIG. 6. Assume Node 144 is located atop a factory with a large amount of machinery. Many times such machinery generates static or shot noise of very short duration but of high amplitude. In such a case, having performed "packet autopsies" on received packets and determined that the type of errors are 'single bit or single symbol' errors, Node 144 would inform communicating nodes (e.g. node 143) to use a different kind of coding with their packets, a coding technique called "interleaving" where single bit errors can be repaired.

These examples illustrate the degree of control the receiving node in a link can have. In a distributed network, each node has the best and most immediate information regarding the potential for data throughput to its location. Through the method and using the apparatus taught in this patent, each link can be optimized very rapidly as packet success and signal speed information is instantaneously incorporated into the on-air signal parameters use on the affected links. Each packet exchanged potentially has a field for the communication of the best on-air parameters to be used in the very next transmission. The method is very general in its application to semi-autonomous nodes communicating within a data communications network.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a mesh network communication system capable of dynamically establishing links between communicating nodes, a method for optimizing net throughput on a link from a first node to a second node, the method comprising steps of:

dynamically establishing the link between the first node and the second node with a first signal, wherein:
the first and second nodes are part of a mesh network communication system, and
each of the first and second nodes sends, receives, forwards packets with the mesh network communication system;

determining at least one performance metric, at the second node, of data-link on-air characteristics of the first signal from the first node;

relaying information relating to the at least one performance metric from the second node to the first node; and dynamically modifying at least one signal characteristic of a second signal transmitted from the first node to the second node, wherein the dynamically modifying step is responsive to at least one performance metric.

2. The method of claim 1 wherein the at least one signal characteristic is selected from the set:
data rate, packet length, modulation type, forward error correction, backwards error correction, bit-wise interleaving, frequency channel selection, power level, block size and computational complexity.

3. The method of claim 1 wherein the performance metric is based, in part, on a probability of successful transmission on the link.

4. The method of claim 1 wherein the performance metric is based, in part, on a probability of bit error of the first signal received at the second node.

5. The method of claim 1 wherein the performance metric is based, in part, on a probability of packet error of the first signal received at the second node.

6. The method of claim 1 wherein the performance metric is based, in part, on a signal strength of the first signal received at the second node.

7. The method of claim 1 wherein the performance metric is based on historical information about the link.

8. The method of claim 1 wherein the performance metric is based on statistical information about the link.

9. The method of claim 1 wherein a data rate of the signal transmitted from the first node is dependent on a required link signal strength.

10. The method of claim 1 wherein the performance metric is calculated in response to a channel setup message received from the first node.

11. The method of claim 1 wherein the dynamically modifying is performed in accordance with a signal parameter message received from the second node.

12. The method of claim 1 wherein a start sequence is transmitted with each packet from the first node to indicate adaptations for receiving a subsequent packet.

13. The method of claim 12 further comprising:
sensing the start sequence of each packet at the second node; and
adjusting interpretation of each packet responsive to the start sequence in order to adapt to the received signal.

14. The method of claim 1 further comprising:
transmitting the signal by the first node using time division multiplexing.

15. The method of claim 1 further comprising
transmitting the first signal by the first node using spread spectrum transmission.

16. The method of claim 1 further comprising:
transmitting the first signal by the first node using frequency hopping.

17. The method of claim 1 wherein the at least one signal characteristic of the signal is chosen from the group consisting of data rate, modulation and occupied bandwidth.

18. The method of claim 1 wherein information relating to the performance metric is stored away from the first node and the second node.

19. In a mesh network communication system capable of dynamically establishing links between a plurality of communication nodes substantially simultaneously, a method for optimizing net throughput on the links between connected nodes, the method comprising steps of:
dynamically establishing links between the plurality of communication nodes, wherein the mesh network transports communications through a series of the plurality of communication nodes in the mesh network;
determining at least one performance metric of data-link on-air characteristics for each of a plurality of signals received at a plurality of receiving nodes;
relaying information relating to the at least one performance metric of data-link on-air characteristics for each of the plurality of signals to a corresponding plurality of transmitting nodes; and
dynamically modifying at each of the plurality of transmitting nodes at least one signal characteristic for each of the plurality of signals transmitted to the respective plurality of receiving nodes, wherein the modifying step for a particular transmitting node of the plurality of transmitting nodes is responsive to the determining step for a particular receiving node of the plurality of receiving nodes that receives a particular signal sent from the particular transmitting node.

20. The method of claim 19 wherein the data-link on-air signal characteristics are selected from the set:
data rate, packet length, modulation type, forward error correction, backwards error correction, bit-wise interleaving, frequency channel selection, power level, block size and computational complexity.

21. The method of claim 19 wherein the receiving nodes each adaptively modifies the signal characteristics of signal transmitted to the transmitting nodes based on the performance metric calculated by the receiving node for the corresponding transmitting nodes.

22. The method of claim 19 wherein the transmitting nodes transmit through limited bandwidth channels.

23. The method of claim 22 wherein the limited bandwidth channels support selected sets of signal characteristics.

24. The method of claim 19 wherein the performance metric is based on historical information about the link from the transmitting node to the receiving node.

25. The method of claim 24 wherein the performance metric is further based on current information about the link from the transmitting node to the receiving node.

26. The method of claim 19 wherein the transmitting node is co-located with another receiving node, whereby both transmitting and receiving are possible from a single location.

27. In a mesh network communication system capable of dynamically establishing links between communication nodes, a transceiver in each node of the communication system comprising:
a receiver for receiving signals transmitted from at least one other node;
a transmitter for transmitting to at least one other node, wherein all nodes are part of the mesh network communication system capable of dynamically establishing links between communication nodes;
a controller connected to the receiver and the transmitter for computing at least one performance metric based on data-link on-air characteristics for each of selected ones of the received signals; and
wherein the transmitter dynamically modifies signal characteristics of selected ones of the transmitted signal based on performance metrics corresponding to the transmitted signals at respective receiving nodes.

28. In a mesh network wireless communication system having dynamically established links between nodes, a controller in a node of said communication system comprising:
a receiver for receiving inbound data signal from at least one other node, wherein the node and the other node are part of a mesh network wireless communication system having dynamically established links between nodes to transport data through a multitude of nodes in the mesh network wireless communication system;
a transmitter for transmitting outbound data signal to at least one other node;
a demodulator connected to the receiver for demodulating the received signal from the receiver;
means for detecting data rate of the demodulated signal from the demodulator; and
means for controlling data rate of the outbound data signal applied to the transmitter.

* * * * *